(12) United States Patent
Tang et al.

(10) Patent No.: US 11,510,177 B2
(45) Date of Patent: Nov. 22, 2022

(54) WIRELESS COMMUNICATION METHOD AND DEVICE

(71) Applicant: Guangdong OPPO Mobile Telecommunications Corp., Ltd., Guangdong (CN)

(72) Inventors: Hai Tang, Dongguan (CN); Zhi Zhang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 48 days.

(21) Appl. No.: 16/893,242

(22) Filed: Jun. 4, 2020

(65) Prior Publication Data
US 2020/0305125 A1   Sep. 24, 2020

Related U.S. Application Data

(63) Continuation of application No. PCT/CN2017/116678, filed on Dec. 15, 2017.

(30) Foreign Application Priority Data

Dec. 6, 2017   (WO) ................ PCT/CN2017/114876

(51) Int. Cl.
*H04W 72/00*   (2009.01)
*H04W 56/00*   (2009.01)
*H04W 72/04*   (2009.01)

(52) U.S. Cl.
CPC ....... *H04W 72/005* (2013.01); *H04W 56/001* (2013.01); *H04W 72/0406* (2013.01)

(58) Field of Classification Search
CPC ... H04W 28/04; H04W 72/04; H04W 72/042; H04W 88/08; H04W 56/001; H04W 72/046; H04W 72/005; H04L 5/0007
(Continued)

(56) References Cited

U.S. PATENT DOCUMENTS

| 8,521,881 | B2* | 8/2013 | Awad ................. | H04W 72/042 709/226 |
| 2008/0181149 | A1* | 7/2008 | Jiang ................. | H04W 12/037 370/310 |

(Continued)

FOREIGN PATENT DOCUMENTS

| CN | 106685873 A | * | 5/2017 | ......... H04L 27/2662 |
| CN | 106793058 A | | 5/2017 | |

(Continued)

OTHER PUBLICATIONS

3GPP TSG RAN WG1 NR AH#3, Nagoya, Japan, Sep. 18-21, 2017, R1-1716524, Agenda item: 6.1.2.1, Source: Nokia, Nokia Shanghai Bell, Title: Remaining details on NR-PBCH. (Year: 2017).*

(Continued)

*Primary Examiner* — Peter G Solinsky
*Assistant Examiner* — Sanjay K Dewan
(74) *Attorney, Agent, or Firm* — Perkins Coie LLP

(57) ABSTRACT

A wireless communications method and device are provided. The method and device lower bit overheads and reduce the complexity of terminal processing in the sending of a synchronization signal (SS) block. The method includes determining that a first indication field in a physical broadcasting channel (PBCH) included in a first SS block is used to indicate a physical resource block (PRB) grid offset between channels or signals of an SS block and a non-SS block or indicate resource information of a second SS block. The method further includes sending the first SS block, wherein when it is determined that the first indication field is used to indicate the resource information of the second SS block, the first indication field in the first SS block indicates the resource information of the second SS block.

20 Claims, 14 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2009/0257382 | A1* | 10/2009 | Qi ........................ | H04L 5/0037 370/329 |
| 2011/0085457 | A1* | 4/2011 | Chen .................... | H04L 1/1854 370/252 |
| 2011/0255489 | A1* | 10/2011 | Zhang .................. | H04L 1/1864 370/329 |
| 2013/0010715 | A1* | 1/2013 | Dinan ................... | H04L 5/0053 370/329 |
| 2013/0121191 | A1* | 5/2013 | Song ..................... | H04W 36/08 370/252 |
| 2013/0142141 | A1* | 6/2013 | Dinan ................ | H04W 36/0005 370/329 |
| 2013/0195020 | A1* | 8/2013 | Frederiksen ........ | H04W 72/042 370/329 |
| 2013/0308557 | A1* | 11/2013 | Gao ..................... | H04L 5/0048 370/329 |
| 2014/0092815 | A1* | 4/2014 | Ye ........................... | H04L 1/00 370/329 |
| 2015/0036560 | A1* | 2/2015 | Kim .................. | H04W 72/0406 370/280 |
| 2017/0331577 | A1 | 11/2017 | Parkvall et al. | |
| 2017/0331670 | A1 | 11/2017 | Parkvall et al. | |
| 2018/0034599 | A1 | 2/2018 | Zhou et al. | |
| 2019/0028315 | A1* | 1/2019 | Park ..................... | H04L 5/0053 |
| 2019/0045553 | A1* | 2/2019 | Zhang ............... | H04W 72/0406 |
| 2019/0053061 | A1 | 2/2019 | Sui et al. | |
| 2019/0132170 | A1* | 5/2019 | Si ......................... | H04L 27/266 |
| 2019/0150118 | A1* | 5/2019 | Nam ..................... | H04L 5/0094 370/329 |

FOREIGN PATENT DOCUMENTS

| | | | | | |
|---|---|---|---|---|---|
| CN | | 106850165 | A * | 6/2017 | ............ H04L 5/0007 |
| CN | | 106998569 | A * | 8/2017 | .......... H04W 56/001 |
| CN | | 107278383 | A * | 10/2017 | ............ H04W 48/10 |
| JP | | 2020536429 | A * | 12/2020 | ........ H04W 72/0446 |
| KR | | 20160081755 | A | 7/2016 | |
| WO | | 2017160222 | A1 | 9/2017 | |
| WO | WO 2017/160222 | A1 * | 9/2017 | ............... H04L 5/00 | |
| WO | WO-2018203672 | A1 * | 11/2018 | .............. H04J 11/00 | |
| WO | | 2019063020 | A1 | 4/2019 | |
| WO | WO 2019063020 | A1 * | 4/2019 | ........ H04W 72/0446 | |

OTHER PUBLICATIONS

Spreadtrum Communications, R1-1717740 "Cell searching with multiple SS blocks in wideband CC", Oct. 9-13, 2017, 5 pages.
OPPO, R1-1718058 "Remaining details on SS block transmissions", Oct. 9-13, 2017.
Nokia et al., R1-1716524 "Remaining details on NR-PBCH". Sep. 18-21, 2017.
European Patent Application No. 17933957.7, Extended European Search Report, dated Nov. 26, 2020, 10 pages.
International Application No. PCT/CN2017/116678, International search report, dated Sep. 3, 2018, 2 pages.
OPPO, "Remaining Details of NR PBCH contents", 3GPP TSG RAN WG1 Meeting #91 R1-1720002, Reno, USA, Nov. 27-Dec. 1, 2017. 3 pages.
OPPO, "Discussion on the RMSI delivery", 3GPP TSG RAN WG1 Meeting 91 R1-1720836, Reno, USA, Oct. 27-Nov. 1, 2017. 3 pages.
Qualcomm Incorporated, "Remaining system information delivery consideration", 3GPP TSG RAN WG1 Meeting 91 R1-1720649, Reno, Nov. 27-Dec. 1, 2017. 6 pages.
LG Electronics, "Remaining Details on PBCH design and contents", 3GPP TSG RAN WG1 Meeting #91 R1-1719893, Reno, USA, Nov. 27-Dec. 1, 2017. 9 pages.
Samsung, "Remaining details on NR-PBCH", 3GPP TSG RAN WG1 Meeting #91 R1-1720273, Reno, USA, Nov. 27-Dec. 1, 2017. 4 pages.
CATT, "Summary of Offline Discussion on Remaining Minimum System Information", 3GPP TSG RAN WG1 Meeting 91 R1-171688, Reno, USA, Nov. 27-Dec. 1, 2017. 15 pages.
Ericsson, "Additional synchronization provision", 3GPP TSG RAN WG1 NR Ad-Hoc#3 R1-1716158, Nagoya, Japan, Sep. 18-21, 2017. 7 pages.
Guangdong OPPO Mobile Telecom, Remaining details on multiple SS block transmissions in wideband CC, 3GPP TSG RAN WG1 Meeting #90 R1-1713252, Prague, Czech Republic, Aug. 21-25, 2017. 5 pages.
Huawei, HiSilicon, "Detailed design of the contents of System Information", 3GPP TSG-RAN2 Meeting #99bis R2-1710458, Prague, Czech Republic, Oct. 9-13, 2017. 7 pages.
First Office Action of the Chinese application No. 202010427106.5, dated Jun. 9, 2021. 21 pages with English translation.
Office Action of the Indian application No. 202017028494, dated Jul. 23, 2021. 6 pages with English translation.
Written Opinion of the International Search Authority in the international application No. PCT/CN2017/116678, dated Sep. 3, 2018 6 pages with English translation.
First Office Action of the Japanese application No. 2020-530312, dated Nov. 26, 2021. 8 pages with English translation.
First Office Action of the Korean application No. 10-2020-7019510, dated Dec. 23, 2021. 11 pages with English translation.
Subsequent Examination Report of the Indian application No. 202017028494, dated Jan. 3, 2022. 2 pages.
CATT: "Remaining details on NR PBCH", 3GPP Draft; R1-1720168, 3rd Generation Partnership Project (3GPP), vol. RAN WG1, No. Reno, USA; Nov. 27, 2017-Dec. 1, 2017 Nov. 18, 2017 (Nov. 18, 2017), XP051369805. 5 pages.
Supplementary European Search Report in the European application No. 22151228.8, dated May 10, 2022. 8 pages.
Notice of Allowance of the Korean application No. 10-2020-7019510, dated Jun. 10, 2022. 3 pages with English translation.

* cited by examiner

200

```
A network device determines that a first indication field
in a PBCH included in a first SS block is used to
indicate a PRB grid offset between channels or signals
of an SS block and a non-SS block or indicate resource
information of a second SS block
```
210

```
The network device sends the first SS block, where
when it is determined that the first indication field is
used to indicate the resource information, the first
indication field in the PBCH included in the sent first SS
block indicates the resource information
```
220

FIG. 2

| PSS | PBCH | SSS | PBCH |

FIG. 5

WIRELESS COMMUNICATION METHOD AND DEVICE

CROSS-REFERENCES TO RELATED APPLICATIONS

This application is a continuation of and claims priority to International Patent Application PCT/CN2017/116678, filed Dec. 15, 2017, which claims priority to International Patent Application PCT/CN2017/114876, filed Dec. 6, 2017, the contents of which are hereby incorporated by reference in their entirety.

BACKGROUND OF THE INVENTION

Technical Field

This application relates to the field of communications, and more specifically, to a wireless communications method and device.

Related Art

In a New Radio (NR) system, a network side may send a synchronization signal (SS) block to a terminal side. The SS block may include a physical broadcasting channel (PBCH) and an SS. The SS may include a primary SS (PSS) and a secondary SS (SSS).

In the NR system, it is desirable to lower bit overheads and reduce the complexity of terminal processing.

Therefore, how to lower bit overheads and reduce the complexity of terminal processing in the sending of an SS block is a problem to be resolved.

SUMMARY OF THE INVENTION

Embodiments of this application provide a wireless communications method and device, to lower bit overheads and reduce the complexity of terminal processing in the sending of an SS block.

A first aspect provides a wireless communications method, including determining that a first indication field in a PBCH included in a first SS block is used to indicate a physical resource block (PRB) grid offset between channels or signals of an SS block and a non-SS block or indicate resource information of a second SS block. The method further includes sending the first SS block, where when it is determined that the first indication field is used to indicate the resource information of the second SS block, the first indication field in the first SS block indicates the resource information of the second SS block.

Therefore, in this embodiment of this application, according to an actual application, an indication field in a first SS block may be used to indicate a PRB grid offset between channels or signals of an SS block and a non-SS block or indicate resource information of a second SS block, so that an information field can be reused and signaling overheads can be reduced. Moreover, when the indication field indicates the resource information of the second SS block, it may become less complex for a terminal device to blindly detect another SS block, thereby reducing the power consumption of the terminal device and reducing an access delay.

With reference to the first aspect, in a possible implementation of the first aspect, when it is determined that the first indication field is used to indicate the PRB grid offset, the first indication field in the first SS block indicates the PRB grid offset.

With reference to the first aspect or any possible implementation described above, in another possible implementation of the first aspect, the PBCH included in the first SS block further includes a second indication field, and the second indication field is used to indicate that the first indication field is used to indicate the PRB grid offset or the resource information of the second SS block.

With reference to the first aspect or any possible implementation described above, in another possible implementation of the first aspect, the PBCH included in the first SS block further includes a second indication field, and when the second indication field indicates resource information of a control channel corresponding to remaining minimum system information (RMSI), the first indication field indicates the PRB grid offset.

With reference to the first aspect or any possible implementation described above, in another possible implementation of the first aspect, the PBCH included in the first SS block further includes a second indication field, and when the second indication field indicates that no associated RMSI exists in the first SS block, the first indication field indicates the resource information of the second SS block.

With reference to the first aspect or any possible implementation described above, in another possible implementation of the first aspect, the second indication field is further used to indicate some information of the resource information of the second SS block, and resource information indicated by the first indication field is some other information of the resource information of the second SS block.

With reference to the first aspect or any possible implementation described above, in another possible implementation of the first aspect, the PBCH included in the first SS block further includes a second indication field, and when the second indication field is used for indicating a part of information of the resource information of the second SS block, the first indication field indicates another part of information of the resource information of the second SS block.

With reference to the first aspect or any possible implementation described above, in another possible implementation of the first aspect, the resource information includes information about an absolute frequency domain location occupied by the second SS block. Alternatively the resource information includes relative frequency offset information between the first SS block and the second SS block. Alternatively, the resource information includes information about a frequency domain range to which an absolute frequency domain location occupied by the second SS block belongs.

With reference to the first aspect or any possible implementation described above, in another possible implementation of the first aspect, at least one of possible frequency domain locations of the second SS block has different intervals from two frequency domain locations adjacent to the at least one frequency domain location.

A second aspect provides a wireless communications method, including receiving a first SS block, determining that a first indication field in a PBCH included in the first SS block indicates a PRB grid offset between channels or signals of an SS block and a non-SS block or indicates resource information of a second SS block, and when the first indication field indicates the resource information of the second SS block, obtaining the resource information of the second SS block from the first indication field.

Therefore, in this embodiment of this application, according to an actual application, an indication field in a first SS block may be used to indicate a PRB grid offset between channels or signals of an SS block and a non-SS block or indicate resource information of a second SS block, so that an information field can be reused and signaling overheads can be reduced. Moreover, when the indication field indicates the resource information of the second SS block, it may become less complex for a terminal device to blindly detect another SS block, thereby reducing the power consumption of the terminal device and reducing an access delay.

With reference to the second aspect, in a possible implementation of the second aspect, the method further includes after obtaining the resource information of the second SS block, receiving the second SS block according to the resource information of the second SS block.

With reference to the second aspect or any possible implementation described above, in another possible implementation of the second aspect, the method further includes when the first indication field indicates the PRB grid offset, obtaining the PRB grid offset from the first indication field.

With reference to the second aspect or any possible implementation described above, in another possible implementation of the second aspect, the method further includes performing control channel reception according to the PRB grid offset, and receiving RMSI according to a received control channel.

With reference to the second aspect or any possible implementation described above, in another possible implementation of the second aspect, the determining that a first indication field in the first SS block indicates a PRB grid offset between channels or signals of an SS block and a non-SS block or indicates resource information of a second SS block includes determining, according to a second indication field in a PBCH included in the second SS block, that the first indication field indicates the PRB grid offset or the resource information.

With reference to the second aspect or any possible implementation described above, in another possible implementation of the second aspect, the PBCH included in the first SS block further includes a second indication field and, when the second indication field indicates resource information of the control channel corresponding to the RMSI, the first indication field indicates the PRB grid offset.

With reference to the second aspect or any possible implementation described above, in another possible implementation of the second aspect, the PBCH included in the first SS block further includes a second indication field and, when the second indication field indicates that no associated RMSI exists in the first SS block, the first indication field indicates the resource information of the second SS block.

With reference to the second aspect or any possible implementation described above, in another possible implementation of the second aspect, the second indication field is further used to indicate some information of the resource information of the second SS block, and resource information indicated by the first indication field is some other information of the resource information of the second SS block.

With reference to the second aspect or any possible implementation described above, in another possible implementation of the second aspect, the PBCH included in the first SS block further includes a second indication field and, when the second indication field is used for indicating a part of information of the resource information of the second SS block, the first indication field indicates another part of information of the resource information of the second SS block.

With reference to the second aspect or any possible implementation described above, in another possible implementation of the second aspect, the resource information of the second SS block includes information about an absolute frequency domain location occupied by the second SS block. Alternatively, the resource information of the second SS block includes relative frequency offset information between the first SS block and the second SS block. Alternatively, the resource information of the second SS block includes information about a frequency domain range to which an absolute frequency domain location occupied by the second SS block belongs.

With reference to the second aspect or any possible implementation described above, in another possible implementation of the second aspect, at least one of possible frequency domain locations of the second SS block has different intervals from two frequency domain locations adjacent to the at least one frequency domain location.

A third aspect provides a wireless communications method, including sending a first SS block, where a PBCH in the first SS block includes at least one indication field, where the at least one indication field is used to carry a first index, the first index includes at least one of M indices, the at least one of M indices is used to indicate a frequency domain location of a second SS block, and M is an integer greater than 1.

Therefore, in this embodiment of this application, a network device adds at least one of M indices to at least one indication field included in a first SS block to indicate a frequency domain location of a second SS block, so that a terminal device may obtain the frequency domain location of the second SS block based on the at least one index.

With reference to the third aspect, in a possible implementation of the third aspect, the M indices include Q indices, frequencies at frequency domain locations indicated by the Q indices are all higher or lower than a frequency at a frequency domain location of the first SS block, and Q is an integer greater than or equal to 1 and less than or equal to M; and at least one of Q frequency domain locations indicated by the Q indices has different intervals from frequency domain locations adjacent to the at least one frequency domain location.

With reference to the third aspect or any possible implementation described above, in another possible implementation of the third aspect, the Q indices belong to N index sets, each index set corresponds to one interval, different index sets correspond to different intervals, and N is an integer greater than or equal to 1 and less than or equal to Q and the interval corresponding to the index set is an interval between two adjacent frequency domain locations of frequency domain locations indicated by indices in the index set.

With reference to the third aspect or any possible implementation described above, in another possible implementation of the third aspect, the index set corresponds to a larger interval in case that a frequency domain location indicated by an index in the index set is farther from the first SS block.

With reference to the third aspect or any possible implementation described above, in another possible implementation of the third aspect, M frequency domain locations indicated by the M indices and the frequency domain location of the first SS block belong to the same band.

With reference to the third aspect or any possible implementation described above, in another possible implementation of the third aspect, M+1 frequency domain locations correspond to the same M intervals, the M+1 frequency domain locations include the M frequency domain locations indicated by the M indices and the frequency domain location of the first SS block, and each of the M intervals is an interval between two adjacent frequency domain locations of the M+1 frequency domain locations.

With reference to the third aspect or any possible implementation described above, in another possible implementation of the third aspect, when the first SS block is located in a first band, the interval is a first interval and, when the first SS block is located in a second band different from the first band, the interval is a second interval that is not equal to the first interval.

With reference to the third aspect or any possible implementation described above, in another possible implementation of the third aspect, the frequency domain location indicated by the at least one of M indices occupies one or more sync rasters.

With reference to the third aspect or any possible implementation described above, in another possible implementation of the third aspect, the M indices include S indices, frequencies at frequency domain locations indicated by the S indices are all higher or lower than a frequency at a frequency domain location of the first SS block, and S is an integer greater than or equal to 1 and less than or equal to M and, in S frequency domain locations indicated by the S indices, a quantity of sync rasters occupied by at least one frequency domain location is different from a quantity of sync rasters occupied by a frequency domain location adjacent to the at least one frequency domain location.

With reference to the third aspect or any possible implementation described above, in another possible implementation of the third aspect, the S indices belong to T index sets, each index set corresponds to one sync raster quantity, different index sets correspond to different sync raster quantities, and T is an integer greater than or equal to 1 and less than or equal to S; and the sync raster quantity corresponding to the index set is a quantity of sync rasters occupied by each of frequency domain locations indicated by indices in the index set.

With reference to the third aspect or any possible implementation described above, in another possible implementation of the third aspect, the index set corresponds to a larger sync raster quantity in case that a frequency domain location indicated by an index in the index set is farther from the first SS block.

With reference to the third aspect or any possible implementation described above, in another possible implementation of the third aspect, the at least one of M indices indicate the frequency domain location of the second SS block by indicating a sync raster offset between the first SS block and the second SS block.

With reference to the third aspect or any possible implementation described above, in another possible implementation of the third aspect, the at least one indication field includes a first indication field, the first indication field can be used to carry information in the at least one of M indices or carry resource information of a control channel corresponding to RMSI, and the method further includes determining that the first indication field needs to carry at least one bit of the at least one of M indices rather than the resource information of the control channel corresponding to the RMSI.

With reference to the third aspect or any possible implementation described above, in another possible implementation of the third aspect, the PBCH further includes a second indication field where, in case that the second indication field is used to indicate that no associated RMSI exists in the first SS block, the first indication field carries at least one bit of the at least one of M indices, and where in case that the second indication field is used to indicate a PRB grid offset between channels or signals of an SS block and a non-SS block, the first indication field carries control information of the control channel corresponding to the RMSI.

With reference to the third aspect or any possible implementation described above, in another possible implementation of the third aspect, in case that the second indication field is used to indicate that no associated RMSI exists in the first SS block, the at least one indication field includes the second indication field, the second indication field is further used to indicate some bits of the first index, and the first indication field indicates some other bits of the first index.

A fourth aspect provides a wireless communications method, including receiving a first SS block, where a PBCH in the first SS block includes at least one indication field, where the at least one indication field is used to carry a first index, the first index includes at least one of M indices, the at least one of M indices is used to indicate a frequency domain location of a second SS block, and M is an integer greater than 1. The method further includes obtaining the frequency domain location of the second SS block from a first indication field.

Therefore, in this embodiment of this application, a network device adds at least one of M indices to at least one indication field included in a first SS block to indicate a frequency domain location of a second SS block, so that a terminal device may obtain the frequency domain location of the second SS block based on the at least one index.

With reference to the fourth aspect, in a possible implementation of the fourth aspect, the M indices include Q indices, frequencies at frequency domain locations indicated by the Q indices are all higher or lower than a frequency at a frequency domain location of the first SS block, and Q is an integer greater than or equal to 1 and less than or equal to M and at least one of Q frequency domain locations indicated by the Q indices has different intervals from frequency domain locations adjacent to the at least one frequency domain location.

With reference to the fourth aspect or any possible implementation described above, in another possible implementation of the fourth aspect, the Q indices belong to N index sets, each index set corresponds to one interval, different index sets correspond to different intervals, and N is an integer greater than or equal to 1 and less than or equal to Q and the interval corresponding to the index set is an interval between two adjacent frequency domain locations of frequency domain locations indicated by indices in the index set.

With reference to the fourth aspect or any possible implementation described above, in another possible implementation of the fourth aspect, the index set corresponds to a larger interval in case that a frequency domain location indicated by an index in the index set is farther from the first SS block.

With reference to the fourth aspect or any possible implementation described above, in another possible implementation of the fourth aspect, M frequency domain locations indicated by the M indices and the frequency domain location of the first SS block belong to the same band.

With reference to the fourth aspect or any possible implementation described above, in another possible implementation of the fourth aspect, M+1 frequency domain locations correspond to the same M intervals, the M+1 frequency domain locations include the M frequency domain locations indicated by the M indices and the frequency domain location of the first SS block, and each of the M intervals is an interval between two adjacent frequency domain locations of the M+1 frequency domain locations.

With reference to the fourth aspect or any possible implementation described above, in another possible implementation of the fourth aspect, when the first SS block is located in a first band, the interval is a first interval and when the first SS block is located in a second band different from the first band, the interval is a second interval that is not equal to the first interval.

With reference to the fourth aspect or any possible implementation described above, in another possible implementation of the fourth aspect, the frequency domain location indicated by the at least one of M indices occupies one or more sync rasters.

With reference to the fourth aspect or any possible implementation described above, in another possible implementation of the fourth aspect, the M indices include S indices, frequencies at frequency domain locations indicated by the S indices are all higher or lower than a frequency at a frequency domain location of the first SS block, and S is an integer greater than or equal to 1 and less than or equal to M and in S frequency domain locations indicated by the S indices, a quantity of sync rasters occupied by at least one frequency domain location is different from a quantity of sync rasters occupied by a frequency domain location adjacent to the at least one frequency domain location.

With reference to the fourth aspect or any possible implementation described above, in another possible implementation of the fourth aspect, the S indices belong to T index sets, each index set corresponds to one sync raster quantity, different index sets correspond to different sync raster quantities, and T is an integer greater than or equal to 1 and less than or equal to S and the sync raster quantity corresponding to the index set is a quantity of sync rasters occupied by each of frequency domain locations indicated by indices in the index set.

With reference to the fourth aspect or any possible implementation described above, in another possible implementation of the fourth aspect, the index set corresponds to a larger sync raster quantity in case that a frequency domain location indicated by an index in the index set is farther from the first SS block.

With reference to the fourth aspect or any possible implementation described above, in another possible implementation of the fourth aspect, the at least one of M indices indicate the frequency domain location of the second SS block by indicating a sync raster offset between the first SS block and the second SS block.

With reference to the fourth aspect or any possible implementation described above, in another possible implementation of the fourth aspect, the at least one indication field includes the first indication field, the first indication field can be used to carry information in the at least one of M indices or carry resource information of a control channel corresponding to RMSI, and the method further includes determining that the first indication field carries at least one bit of the at least one of M indices rather than the resource information of the control channel corresponding to the RMSI.

With reference to the fourth aspect or any possible implementation described above, in another possible implementation of the fourth aspect, the PBCH further includes a second indication field in case that the second indication field is used to indicate that no associated RMSI exists in the first SS block, the first indication field carries at least one bit of the at least one of M indices and in case that the second indication field is used to indicate a PRB grid offset between channels or signals of an SS block and a non-SS block, the first indication field carries control information of the control channel corresponding to the RMSI.

With reference to the fourth aspect or any possible implementation described above, in another possible implementation of the fourth aspect, in case that the second indication field is used to indicate that no associated RMSI exists in the first SS block, the at least one indication field includes the second indication field, where the second indication field is further used to indicate some bits of the first index and where the first indication field indicates some other bits of the first index.

A fifth aspect provides a network device, configured to perform the foregoing method in the first aspect or any possible implementation of the first aspect. Specifically, the network device includes units configured to perform the foregoing method in the first aspect or any possible implementation of the first aspect or the third aspect or any possible implementation of the third aspect.

A sixth aspect provides a terminal device, configured to perform the foregoing method in the second aspect or any possible implementation of the second aspect. Specifically, the terminal device includes units configured to perform the method in the second aspect or any possible implementation of the second aspect or the method in the fourth aspect or any possible implementation of the fourth aspect.

A seventh aspect provides a network device. The network device includes a memory, a processor, an input interface, and an output interface. The memory, the processor, the input interface, and the output interface are connected by using a bus system. The memory is configured to store an instruction, and the processor is configured to perform the instruction stored in the memory, to perform the method in the first aspect or any possible implementation of the first aspect or the third aspect or any possible implementation of the third aspect.

An eighth aspect provides a terminal device. The terminal device includes a memory, a processor, an input interface, and an output interface. The memory, the processor, the input interface, and the output interface are connected by using a bus system. The memory is configured to store an instruction, and the processor is configured to perform the instruction stored in the memory, to perform the method in the second aspect or any possible implementation of the second aspect or the fourth aspect or any possible implementation of the fourth aspect.

A ninth aspect provides a computer storage medium. The computer storage medium is configured to store a computer software instruction that is used to perform the method in the first aspect or any possible implementation of the first aspect, and the computer software instruction includes a program designed to perform the foregoing aspect.

A tenth aspect provides a computer program product including an instruction, and when the product is run on a computer, the computer is enabled to perform the method in the first aspect or any optional implementation of the first aspect.

BRIEF DESCRIPTION OF THE DRAWINGS

FIG. 2 is a schematic flowchart of a wireless communications method according to an embodiment of this application.

FIG. 5 is a schematic diagram of the distribution of signals or channels in an SS block according to an embodiment of this application.

DETAILED DESCRIPTION OF THE INVENTION

The technical solutions in embodiments of this application are described below with reference to the accompanying drawings in the embodiments of this application.

The technical solutions according to the embodiments of this application may be applied to a variety of communications systems, such as a Global System for Mobile communications (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD) system, a Universal Mobile Telecommunications system (UMTS), a Worldwide Interoperability for Microwave Access (WiMAX) communications system, a future 5G system, or the like.

Figure 1:
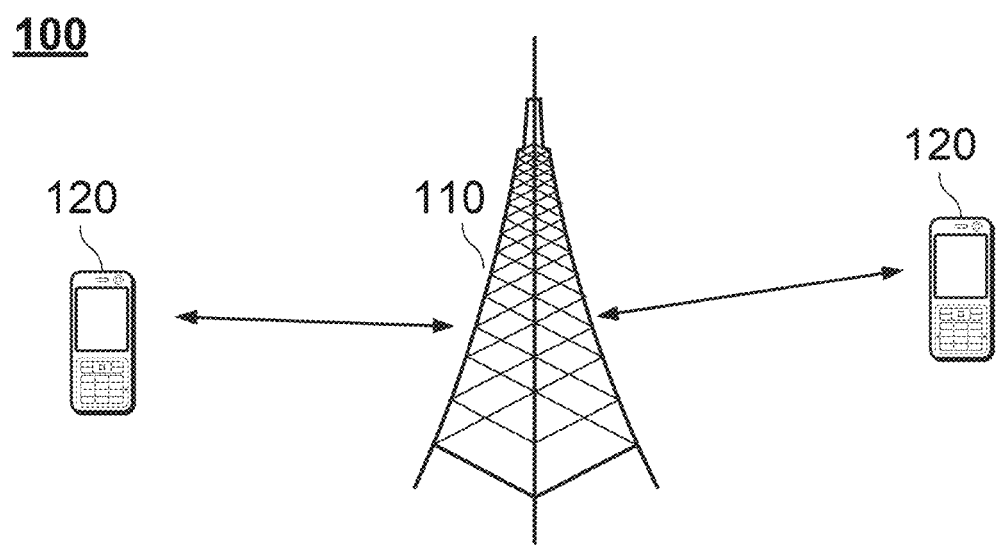
FIG. 1 is a schematic diagram of a wireless communications system according to an embodiment of this application.

FIG. 1 shows a wireless communications system 100 to which an embodiment of this application is applied. The wireless communications system 100 may include a network device 110. The network device 110 may be a device that communicates with a terminal device. The network device 110 may provide communication coverage for a particular geographic area, and may communicate with a terminal device (for example, UE) located within the area of the coverage. Optionally, the network device 110 may be a base transceiver station (BTS) in a GSM system or CDMA system, or may be a NodeB (NB) in a WCDMA system, or may be an evolutional NodeB (eNB or eNodeB) in an LTE system, or a wireless controller in a cloud radio access network (CRAN), or the network device may be a relay station, an access point, an in-vehicle device, a wearable device, a network side device in a future 5G network, a network device in a future evolved common land mobile network (PLMN) or the like.

The wireless communications system 100 further includes at least one terminal device 120 located within the range of the coverage of the network device 110. The terminal device 120 may be mobile or fixed. Optionally, the terminal device 120 may be an access terminal, user equipment (UE), a subscriber unit, a subscriber station, a mobile station, a mobile console, a remote station, a remote terminal, a mobile device, a user terminal, a terminal, a wireless communications device, a user agent or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, a terminal device in a future evolved PLMN or the like.

Optionally, the terminal devices 120 may perform device to device (D2D) communication with each other.

Optionally, the 5G system or network may also be referred to as an NR system or network.

FIG. 1 shows one network device and two terminal devices as an example. Optionally, the wireless communications system 100 may include a plurality of network devices, and another quantity of terminal devices may be included in the coverage of each network device. This is not limited in this embodiment of this application.

In the wireless communications system 100, the terminal device may have one or more antenna array blocks used for uplink data transmission. Each antenna array block has an independent radio frequency channel. One demodulation reference signal (DMRS) port group corresponds to one antenna array block. After determining transmission parameters of one antenna array block, the terminal device may transmit data on a corresponding DMRS port group on the antenna array block.

Optionally, the wireless communications system 100 may further include other network entities such as a network controller and a mobility management entity. This is not limited in this embodiment of this application.

It should be understood that, the terms "system" and "network" in this specification are usually interchangeably used in this specification. The term "and/or" in this specification is only an association relationship for describing the associated objects, and represents that three relationships may exist, for example, A and/or B may represent the following three cases: A exists separately, both A and B exist, and B exists separately. In addition, the character "/" in this specification generally indicates an "or" relationship between the associated objects.

FIG. 2 is a schematic flowchart of a wireless communications method 200 according to an embodiment of this application. As shown in FIG. 2, the method 200 includes at least a part of the following content.

In 210, a network device determines that a first indication field in a PBCH included in a first SS block is used to indicate a PRB grid offset between channels or signals of an SS block and a non-SS block or indicate resource information of a second SS block.

Specifically, a first indication field in a PBCH included in an SS block may be used to indicate a PRB grid offset between channels or signals of an SS block and a non-SS block or used to indicate resource information of another SS block. In this case, when the SS block is sent, it is necessary to determine whether the first indication field is used to indicate the PRB grid offset or the resource information of the another SS block.

For ease of understanding of this application, a PRB grid offset between channels or signals of an SS block and a non-SS block is described below.

Specifically, a frequency resource in a bandwidth may be divided in the unit of a resource block (RB). Each RB may include 12 subcarriers. However, RB division of an SS block and RB division of other channels or signals may be not aligned. For example, there may be an inconsistent starting subcarrier in one RB, but instead an offset exists. Therefore, an indication field in a PBCH may be used to indicate an offset between RBs.

For example, four bits may be used to indicate the offset between RBs may be resource elements (RE) of 0 to 11 SS blocks. Alternatively, five bits are used to indicate that the offset between RBs is REs of 0 to 23 SS blocks.

It should be understood that the PRB grid offset mentioned in this embodiment of this application may have other names. This is not specifically limited in this embodiment of this application.

Optionally, the resource information of the second SS block indicated in the first indication field may be all or some of the resource information of the second SS block.

Optionally, the channel or signal of the non-SS block in this embodiment of this application may be, for example, a physical downlink control channel (PDCCH) or a physical downlink shared channel (PDSCH).

In 220, the network device sends the first SS block, where when it is determined that the first indication field is used to indicate the resource information, the first indication field in the PBCH included in the sent first SS block indicates the resource information.

Specifically, when the network device determines that the first indication field needs to indicate the resource information of the another SS block, the resource information of the another SS block may be carried in the first indication field and the SS block is sent.

Figure 3:
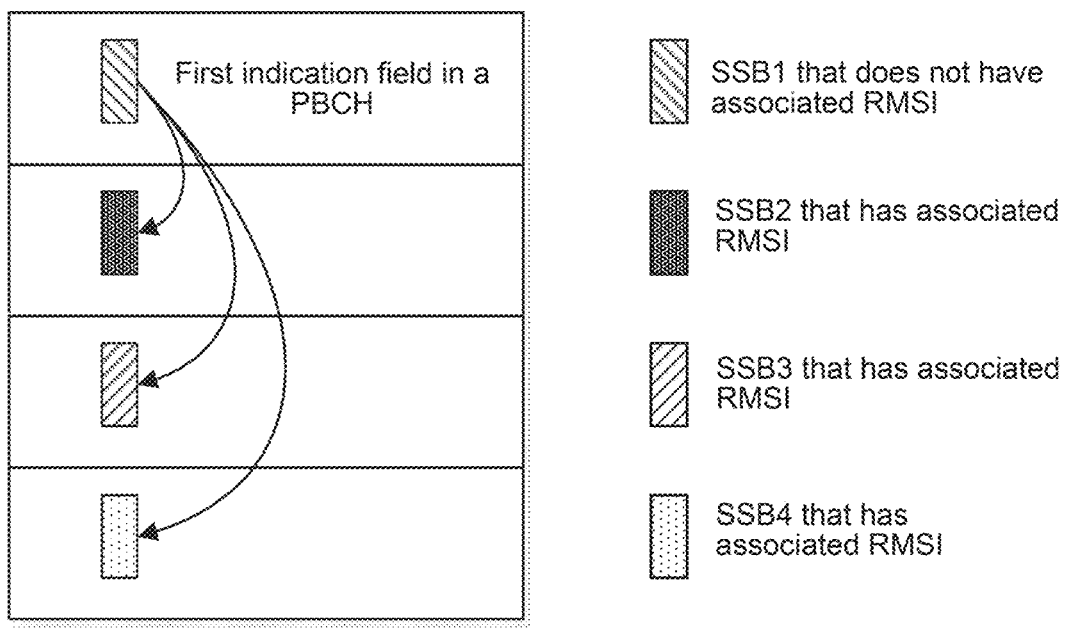
FIG. 3 is a schematic diagram of a first indication field indicates another SS block according to an embodiment of this application.

For example, as shown in FIG. 3, in a first indication field in a PBCH in an SSB1 that does not have associated RMSI, resource information of an SSB2 that has associated RMSI may be indicated, or resource information of an SSB3 that has associated RMSI may be indicated, or resource information of an SSB4 that has associated RMSI may be indicated.

Optionally, the SSB that does not have associated RMSI means that the SSB does not carry resource information of a control channel used to schedule the RMSI.

Optionally, the resource information of the second SS block may be information about a frequency domain resource occupied by the SS block.

For example, the resource information may include information about an absolute frequency domain location occupied by the second SS block. Alternatively, the resource information may include relative frequency offset information between the first SS block and the second SS block. Alternatively the resource information may include information about a frequency domain range to which an absolute frequency domain location occupied by the second SS block belongs.

Optionally, at least one frequency domain location exists at possible frequency domain locations of the second SS block. Each of the at least one frequency domain location has different intervals from two frequency domain locations adjacent to the frequency domain location.

Specifically, because a quantity of bits (for example, the first indication field or the first indication field and a second indication field of this application) that are in the first SS block and can be used to indicate the resource information of the another SS block may be limited, frequency domain locations (possible frequency domain locations of the second SS block) that may be indicated by the first SS block may be unevenly distributed. For example, in a frequency domain, frequency domain locations that may be indicated are distributed more densely in case that the frequency domain locations are closer to the first SS block, and frequency domain locations that may be indicated are distributed more sparsely in case that the frequency domain locations are farther from the first SS block. In this case, at least one frequency domain location exists in the frequency domain locations that may be indicated. Each of the at least one frequency domain location has different intervals from two frequency domain locations adjacent to the frequency domain location.

Optionally, when it is determined that the first indication field is used to indicate the PRB grid offset, the first indication field in the PBCH included in the first SS block indicates the PRB grid offset.

Specifically, when the network device determines that the first indication field needs to indicate the PRB grid offset, the information indicating the PRB grid offset may be carried in the first indication field, and the SS block is sent.

In this case, the network device may send a control channel. A grid offset between the control channel and the first SS block is a grid offset indicated by the first indication field. The control channel is used to schedule the RMSI.

Optionally, the SS block, for example, the first SS block or the second SS block, in this embodiment of this application may be sent in a multi-beam manner.

Figure 4:
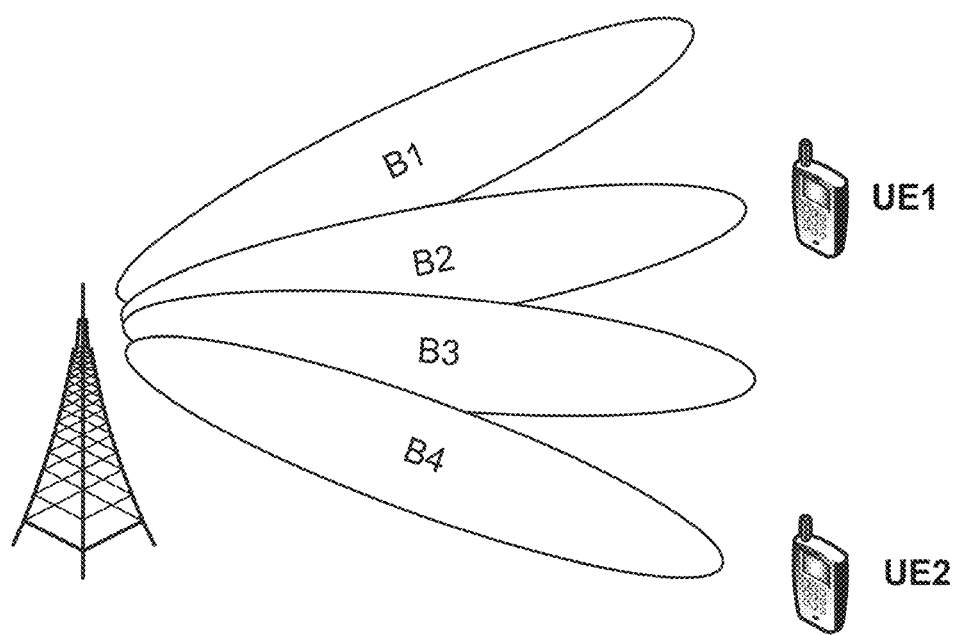
FIG. 4 is a schematic diagram of sending a signal or channel by using a plurality of beams according to an embodiment of this application.

Specifically, a band used in an NR system is higher than that used in LTE. Therefore, wireless signal transmission has a higher path loss, and wireless signal coverage becomes smaller. In this case, in a feasible method, the network device may use a multi-antenna system and a beamforming technique to form a beam to improve wireless signal gain to compensate for a path loss. A beam is directed, and a narrow beam covers a partial area of a cell but cannot cover all terminal devices in the cell. For example, as shown in FIG. 4, a network side may send signals by using beams in four different directions (namely, B1, B2, B3, and B4). For example, the beam B2 can cover only a UE1 but cannot cover a UE2.

Figure 5:
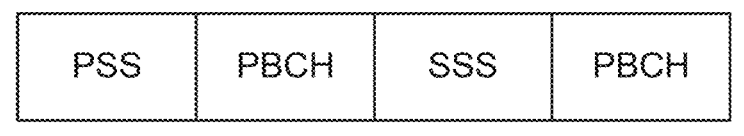

In the NR system, common channels or signals, for example, an SS and an SS block of a broadcast channel may cover an entire cell through multi-beam scanning, and therefore can be conveniently received by UEs in the cell. AN SS block is sent on a plurality of beams by defining an SS burst set. One SS burst set includes one or more SS bursts. One SS burst includes one or more SS blocks. One SS block is used to carry an SS and a broadcast channel of one beam. Therefore, one SS burst set may include SSs of beams whose quantity is equal to the quantity of SS blocks in the cell. One SS block includes a PSS of one symbol, an SS of one symbol, and PBCHs of two symbols, for example, as shown in FIG. 5.

A period of the SS burst set is configurable, and SS burst set bearers sent in one period can be sent in a time window of 5 ms. For example, in a 15-kHz subcarrier interval, one slot includes 14 symbols and can carry two SS blocks.

Optionally, in addition to an SS and a PBCH that require multi-beam scanning, some other common information such as the RMSI and paging may also be sent in a multi-beam scanning manner.

Optionally, the PBCH included in the first SS block further includes a second indication field, and the second indication field is used to indicate that the first indication field is used to indicate the PRB grid offset or the resource information of the second SS block.

The second indication field may explicitly indicate that the first indication field is used to indicate the PRB grid offset or the resource information of the second SS block. For example, the second indication field may include information of one bit. When a value of the bit in the second indication field is 1, it indicates that the first indication field is used to indicate the PRB grid offset. When the value of the bit in the second indication field is 0, it indicates that the first indication field is used to indicate the resource information of the another SS block.

Certainly, the second indication field may implicitly indicate that the first indication field is used to indicate the PRB grid offset or the resource information of the second SS block. This is not specifically limited in this embodiment of this application.

Optionally, the PBCH included in the first SS block further includes a second indication field. When the second indication field indicates resource information of the control channel corresponding to the RMSI, the first indication field indicates the PRB grid offset.

Specifically, because the second indication field indicates the resource information of the control channel corresponding to the RMSI, it indicates that the first SS block has associated RMSI. To receive the RMSI, information used to indicate the PRB grid offset may be carried in the first indication field.

Optionally, the PBCH included in the first SS block further includes a second indication field. When the second indication field indicates that no associated RMSI exists in the first SS block, the first indication field indicates the resource information.

Specifically, when needing to access a network, a terminal device needs to obtain a system message from the network. The system message is partially carried in the PBCH and is partially carried in the PDSCH. The system message carried in the PDSCH includes the RMSI. DCI corresponding to the PDSCH is carried in an NR-PDCCH. A time domain resource location of the PDCCH is indicated by a control resource set (CORESET) information field carried in the PBCH. In addition, the PBCH further carries information used to indicate whether the SS block is associated with the RMSI, that is, carries RMSI presence flag information.

Specifically, when the CORESET information field (the second indication field) of the RMSI indicates that no associated RMSI exists, a PRB grid offset information field may be used to indicate the resource information of the another SS block. In this case, the terminal device cannot receive the RMSI and cannot obtain system information to receive another channel. Therefore, the PRB grid offset information field no longer needs to indicate the PRB grid offset between the channels or signals of the SS block and the non-SS block. In this case, the PRB grid offset information field may be used to indicate resource information of the another SS block, so that the number of times that the terminal device blindly detects an SS block can be reduced, and the terminal detects the PBCH according to the resource information of the another SS block to obtain CORESET information of the RMSI, so as to receive the RMSI.

Optionally, when the second indication field indicates that no associated RMSI exists in the first SS block, the second indication field is further used to indicate some information of the resource information of the second SS block, and the resource information indicated by the first indication field is some other information of the resource information of the second SS block.

Specifically, because the second indication field indicates that no associated RMSI exists in the first SS block, the information carried in the second indication field is used as some information of the resource information of the second SS block. Therefore, the information in the second indication field and the information in the first indication field are together used to indicate the resource information of the second SS block, so that bits can be used more appropriately.

The second indication field may have a plurality of values used to indicate the resource information of the second SS block. Specific values to be used may be determined according to the second SS block that needs to be sent.

Optionally, the PBCH included in the first SS block further includes a second indication field. When the second indication field is used for indicating a part of information of the resource information of the second SS block, the first indication field indicates another part of information of the resource information of the second SS block.

Specifically, because the second indication field indicates that no associated RMSI exists in the first SS block, the information carried in the second indication field is used as some information of the resource information of the second SS block. Therefore, the information in the second indication field and the information in the first indication field are together used to indicate the resource information of the second SS block, so that bits can be used more appropriately.

The second indication field may have a plurality of values used to indicate the resource information of the second SS block. Specific values to be used may be determined according to the second SS block that needs to be sent.

To understand this application more clearly, the second indication field is described below.

Specifically, in a 5G NR system, for an initially connected terminal device, a common search space may be defined to receive common control information, for example, control information for scheduling the RMSI. Therefore, the concept of a CORESET is introduced to define a resource set for carrying the control information. The terminal device may detect a PDCCH channel in the resource set to obtain scheduling information of a PDSCH that carries the RMSI. The indication information of the CORESET is carried in an NR-PBCH and used by the terminal to receive the RMSI. Configuration information of the CORESET mainly includes the following information: a frequency domain resource, a starting OFDM symbol, a time length, and the like.

Figure 6:
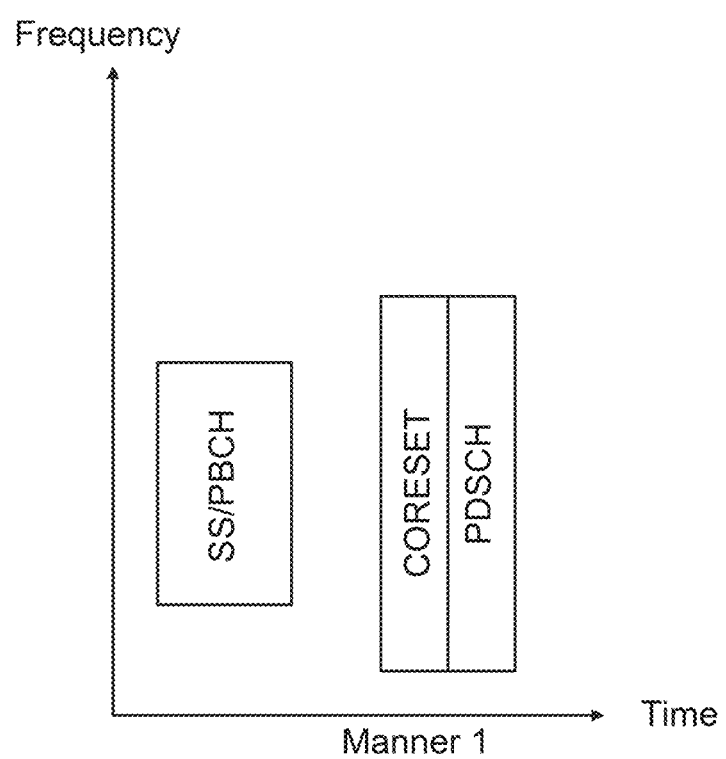
FIG. 6 is a schematic diagram of a manner of reusing a channel or signal according to an embodiment of this application.
Figure 7:
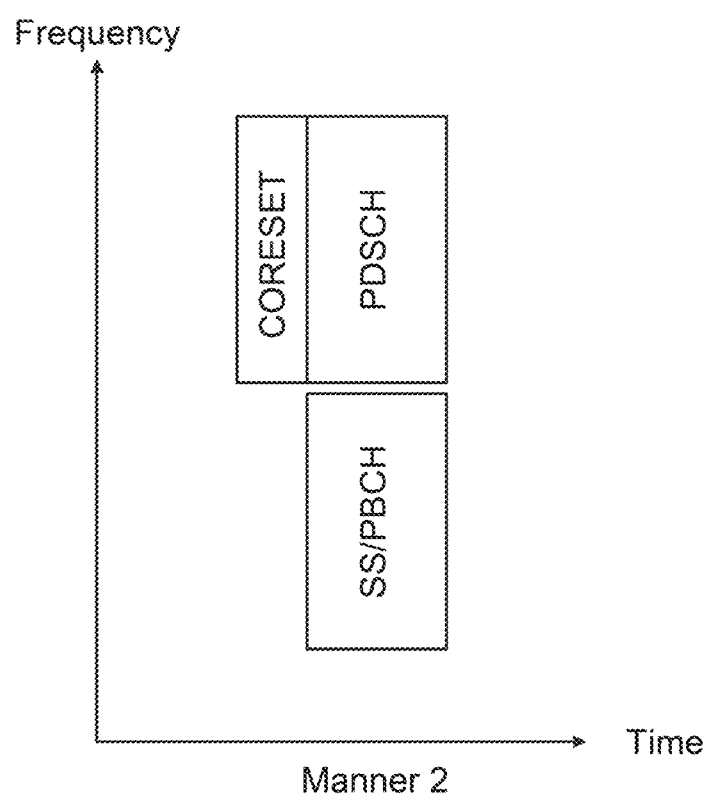
FIG. 7 is a schematic diagram of a manner of reusing a channel or signal according to an embodiment of this application.
Figure 8:
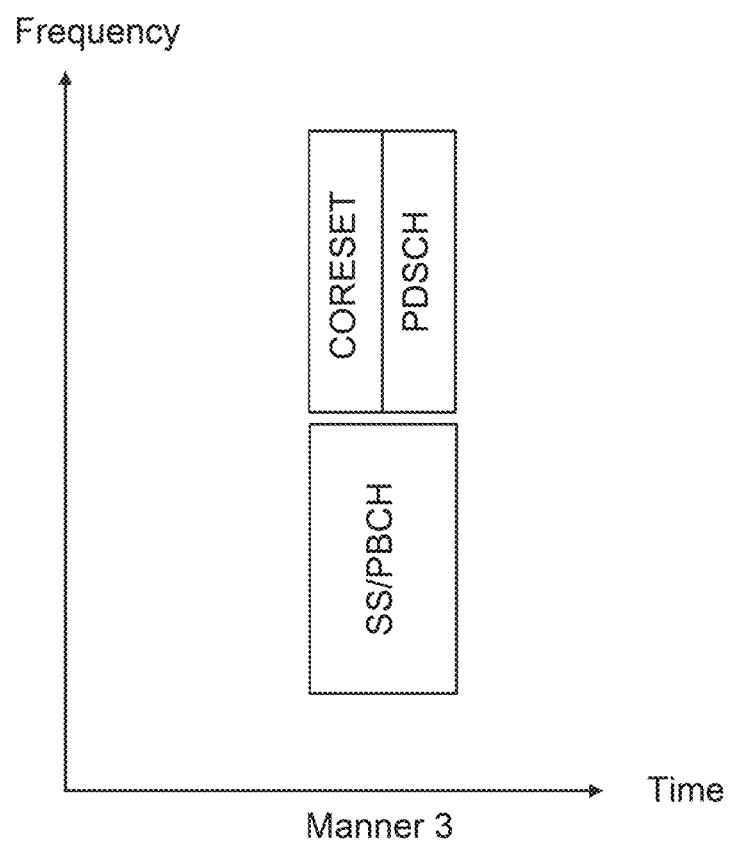
FIG. 8 is a schematic diagram of a manner of reusing a channel or signal according to an embodiment of this application.

The CORESET information of the RMSI is related to a subcarrier interval between the RMSI and the SS/PBCH and a multiplexing pattern of the RMSI and the SS/PBCH. The subcarrier interval includes {SSB SCS, RMSI SCS}={15, 15}, {15, 30}, {30, 15}, {30, 30}, {120, 60}, {120,120}, {240, 60}, and {240, 120}} kHz. A manner of multiplexing the RMSI and the SS/PBCH is a manner 1 shown in FIG. 6, a manner 2 shown in FIG. 7, and a manner 3 shown in FIG. 8.

Optionally, a table is configured to indicate the CORESET information. As shown in the following Table 1, when {SSB SCS, RMSI SCS}={15, 15} kHz, the time domain and frequency domain locations of the CORESET and combinations of the CORESET are indicated by a configuration index. For example, indices 1 to 15 are used to indicate the CORESET information. Optionally, an index 16 is used to indicate that no associated RMSI exists.

TABLE 1

| Configuration index | Multiplexing manner | Occupied bandwidth part | Quantity of symbols occupied by CORESET | Frequency domain offset of a basic parameter set in a PRB (Frequency Offset in PRB of RMSI CORESET numerology) |
|---|---|---|---|---|
| 1 | Manner 1 | 24 | 2 | 0 |
| 2 | Manner 1 | 24 | 2 | 2 |
| 3 | Manner 1 | 24 | 2 | 4 |
| 4 | Manner 1 | 24 | 3 | 0 |
| 5 | Manner 1 | 24 | 3 | 2 |
| 6 | Manner 1 | 24 | 3 | 4 |
| 7 | Manner 1 | 48 | 1 | 12 |
| 8 | Manner 1 | 48 | 1 | 16 |
| 9 | Manner 1 | 48 | 2 | 12 |
| 10 | Manner 1 | 48 | 2 | 16 |
| 11 | Manner 1 | 48 | 3 | 12 |
| 12 | Manner 1 | 48 | 3 | 16 |
| 13 | Manner 1 | 96 | 1 | 38 |
| 14 | Manner 1 | 96 | 2 | 38 |
| 15 | Manner 1 | 96 | 3 | 38 |
| 16 | It indicates that no associated RMSI exists | | | |

For example, as shown in the following Table 2, when {SSB SCS, RMSI SCS}={15, 15} kHz, the time domain and frequency domain locations of CORESET and combinations of CORESET are indicated by a configuration index. For example, indices 1 to 15 are used to indicate the CORESET information. Indices 16 to 18 are used to indicate some information of resource information of another non-SS block.

TABLE 2

| Configuration index | Multiplexing manner | Occupied bandwidth part | Quantity of symbols occupied by CORESET | Frequency domain offset of a basic parameter set in a PRB (Frequency Offset in PRB of RMSI CORESET numerology) |
|---|---|---|---|---|
| 1 | Manner 1 | 24 | 2 | 0 |
| 2 | Manner 1 | 24 | 2 | 2 |
| 3 | Manner 1 | 24 | 2 | 4 |
| 4 | Manner 1 | 24 | 3 | 0 |
| 5 | Manner 1 | 24 | 3 | 2 |
| 6 | Manner 1 | 24 | 3 | 4 |
| 7 | Manner 1 | 48 | 1 | 12 |
| 8 | Manner 1 | 48 | 1 | 16 |
| 9 | Manner 1 | 48 | 2 | 12 |
| 10 | Manner 1 | 48 | 2 | 16 |
| 11 | Manner 1 | 48 | 3 | 12 |
| 12 | Manner 1 | 48 | 3 | 16 |
| 13 | Manner 1 | 96 | 1 | 38 |
| 14 | Manner 1 | 96 | 2 | 38 |
| 15 | Manner 1 | 96 | 3 | 38 |
| 16 | Some information of resource information of another non-SS block | | | |
| 17 | Some information of resource information of another non-SS block | | | |
| 18 | Some information of resource information of another non-SS block | | | |

Therefore, in this embodiment of this application, according to an actual application, an indication field in a first SS block may be used to indicate a PRB grid offset between channels or signals of an SS block and a non-SS block or indicate resource information of a second SS block, so that an information field can be reused and signaling overheads can be reduced. Moreover, when the indication field indicates the resource information of the second SS block, it may become less complex for a terminal device to blindly detect another SS block, thereby reducing the power consumption of the terminal device and reducing an access delay.

Figure 9:
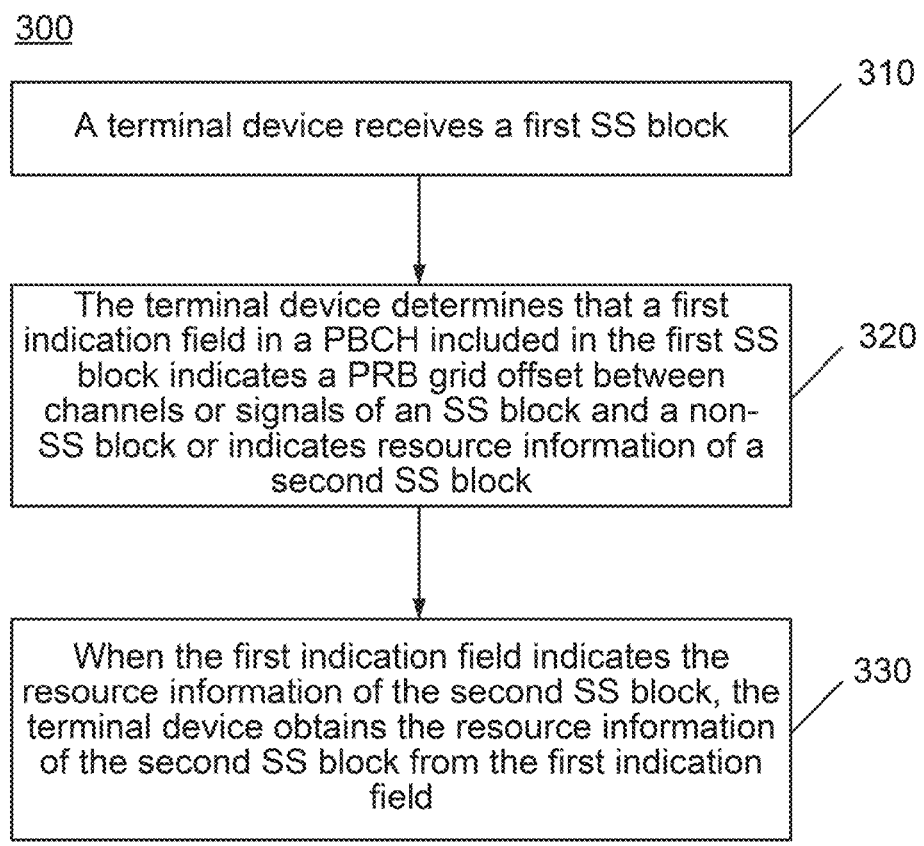
FIG. 9 is a schematic flowchart of a wireless communications method according to an embodiment of this application.

FIG. 9 is a schematic flowchart of a wireless communications method 300 according to an embodiment of this application. As shown in FIG. 9, the method 300 includes at least a part of the following content.

In 310, a terminal device receives a first SS block.

In 320, the terminal device determines that a first indication field in a PBCH included in the first SS block indicates a PRB grid offset between channels or signals of an SS block and a non-SS block or indicates resource information of a second SS block.

In 330, when the first indication field indicates the resource information of the second SS block, the terminal device obtains the resource information of the second SS block from the first indication field.

Optionally, after obtaining the resource information of the second SS block, the terminal device receives the second SS block according to the resource information of the second SS block.

Optionally, when the first indication field indicates the PRB grid offset, the terminal device obtains the PRB grid offset from the first indication field.

Optionally, the terminal device receives a control channel according to the PRB grid offset, and receives RMSI according to the received control channel.

Optionally, the terminal device determines, according to a second indication field in the PBCH included in the second SS block, that the first indication field indicates the PRB grid offset or the resource information.

Optionally, the PBCH included in the first SS block further includes a second indication field and when the second indication field indicates resource information of the control channel corresponding to the RMSI, the first indication field indicates the PRB grid offset.

Optionally, the PBCH included in the first SS block further includes a second indication field and when the second indication field indicates that no associated RMSI exists in the first SS block, the first indication field indicates the resource information of the second SS block.

Optionally, the second indication field is further used to indicate some information of the resource information of the second SS block, and resource information indicated by the first indication field is some other information of the resource information of the second SS block.

Optionally, the PBCH included in the first SS block further includes a second indication field and when the second indication field is used for indicating a part of information of the resource information of the second SS block, the first indication field indicates another part of information of the resource information of the second SS block.

Optionally, the resource information of the second SS block includes information about an absolute frequency domain location occupied by the second SS block. As an alternative option, the resource information of the second SS block includes relative frequency offset information between the first SS block and the second SS block or the resource information of the second SS block includes information about a frequency domain range to which an absolute frequency domain location occupied by the second SS block belongs.

Optionally, at least one of possible frequency domain locations of the second SS block has different intervals from two frequency domain locations adjacent to the at least one frequency domain location.

Therefore, in this embodiment of this application, according to an actual application, an indication field in a first SS block may be used to indicate a PRB grid offset between channels or signals of an SS block and a non-SS block or indicate resource information of a second SS block, so that an information field can be reused and signaling overheads can be reduced. Moreover, when the indication field indicates the resource information of the second SS block, it may become less complex for a terminal device to blindly detect another SS block, thereby reducing the power consumption of the terminal device and reducing an access delay.

Figure 10:
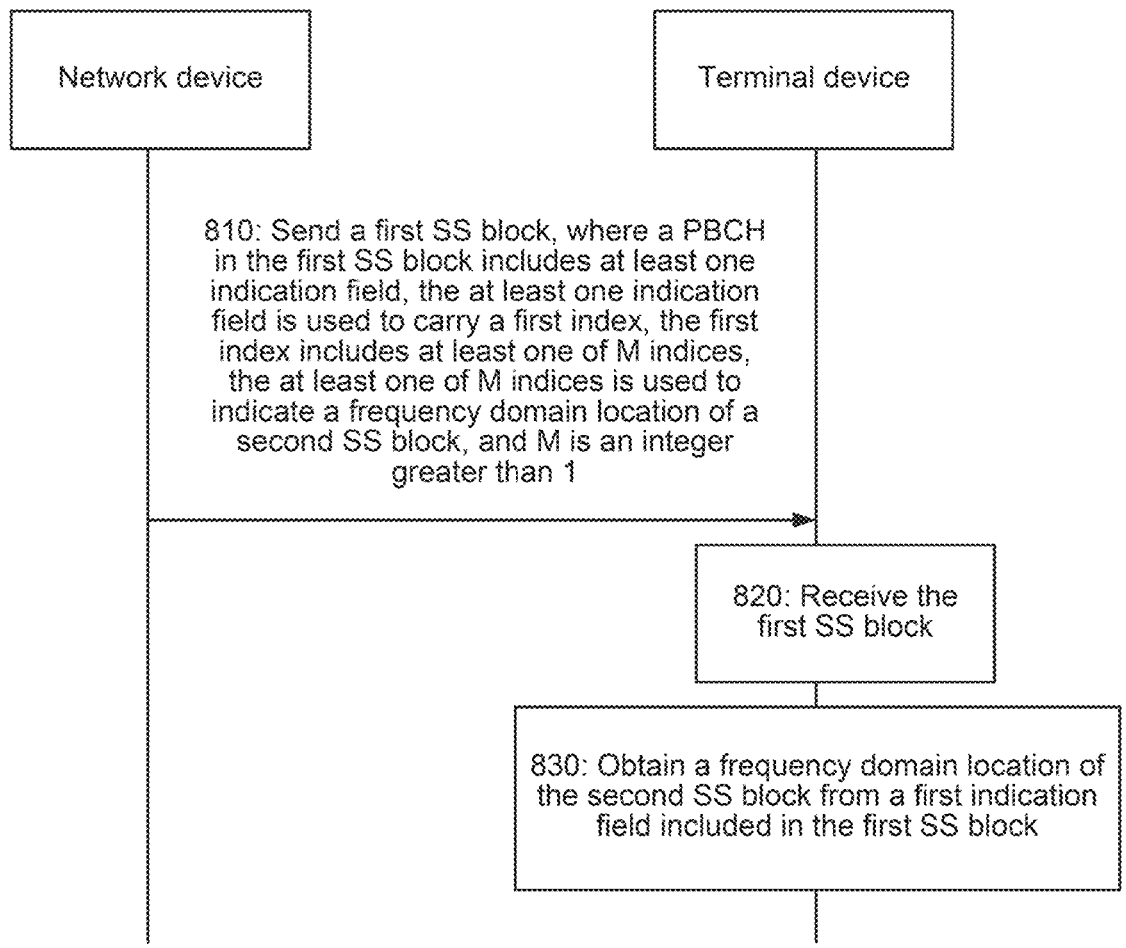
FIG. 10 is a schematic flowchart of a wireless communications method according to an embodiment of this application.

FIG. 10 is a schematic flowchart of a wireless communications method 800 according to an embodiment of this application. The method 800 includes at least a part of the following content.

In 810, a network device sends a first SS block, where a PBCH in the first SS block includes at least one indication field.

The at least one indication field is used to carry a first index, the first index includes at least one of M indices, the at least one of M indices is used to indicate a frequency domain location of a second SS block, and M is an integer greater than 1.

The M indices are indices that can be carried in the first SS block, M frequency domain locations indicated by the M indices are frequency domain locations that can be indicated by the first SS block, an SS block can be sent at a frequency domain location other than the M frequency domain locations, but the SS block cannot be indicated by the first SS block.

Optionally, the frequency domain location indicated by the at least one of M indices occupies one or more sync rasters.

Specifically, the frequency domain location indicated by each index may occupy one or more sync rasters. When the frequency domain location occupies a plurality of sync rasters, the second SS block may occupy all the plurality of sync rasters or occupy some of the sync rasters. In this case, a terminal device may obtain the second SS block through blind detection.

Optionally, the at least one of M indices indicate the frequency domain location of the second SS block by indicating a sync raster offset between the first SS block and the second SS block.

Certainly, the at least one of M indices may alternatively directly indicate an absolute frequency domain location of the second SS block.

In 820, the terminal device receives the first SS block sent by the network device.

In 830, the terminal device obtains a frequency domain location of the second SS block from a first indication field included in the first SS block. Therefore, the terminal device may receive the second SS block based on the frequency domain location of the second SS block.

Optionally, the M indices include Q indices, frequencies at frequency domain locations indicated by the Q indices are all higher or lower than a frequency at a frequency domain location of the first SS block, and Q is an integer greater than or equal to 1 and less than or equal to M; and at least one of Q frequency domain locations indicated by the Q indices has different intervals from frequency domain locations adjacent to the at least one frequency domain location.

Specifically, the Q frequency domain locations exist in a frequency domain having a frequency higher than that at the frequency domain location of the first SS block, the Q frequency domain locations may be indicated by the Q indices, and at least one of the Q frequency domain locations has different intervals from frequency domain locations adjacent to the at least one frequency domain location, that is, the Q frequency domain locations are unevenly distributed in the frequency domain. If Q is less than M, the remaining M-Q frequency domain locations may be located in a frequency domain having a frequency lower than that at the frequency domain location of the first SS block. The M-Q frequency domain locations may be unevenly distributed. That is, at least one of the M-Q frequency domain locations has different intervals from frequency domain locations adjacent to the at least one frequency domain location. Alternatively, the M-Q frequency domain locations may be evenly distributed. That is, the intervals between adjacent frequency domain locations are the same.

Alternatively, the Q frequency domain locations exist in a frequency domain having a frequency lower than that at the frequency domain location of the first SS block, the Q frequency domain locations may be indicated by the Q indices, and at least one of the Q frequency domain locations has different intervals from frequency domain locations adjacent to the at least one frequency domain location, that is, the Q frequency domain locations are unevenly distributed in the frequency domain. If Q is less than M, the remaining M-Q frequency domain locations may be located in a frequency domain having a frequency higher than that at the frequency domain location of the first SS block. The M-Q frequency domain locations may be unevenly distributed. That is, at least one of the M-Q frequency domain locations has different intervals from frequency domain locations adjacent to the at least one frequency domain location. Alternatively, the M-Q frequency domain locations may be evenly distributed. That is, the intervals between adjacent frequency domain locations are the same.

Optionally, a quantity of frequency domain locations (frequency domain locations that can be indicated by the first indication field) of the second SS block in a frequency domain having a frequency lower than that at the frequency domain location of the first SS block may be equal to a quantity of frequency domain locations (frequency domain locations that can be indicated by the first indication field) of the second SS block in a frequency domain having a frequency higher than that at the frequency domain location of the first SS block.

With the frequency domain location of the first SS block being the center point, frequency domain locations in a higher frequency domain and frequency domain locations in a lower frequency domain may be symmetrical, and certainly, may be alternatively asymmetrical.

Optionally, a sync raster may or may not exist between a last sync raster of a former frequency domain location and a first sync raster of a latter frequency domain location of adjacent frequency domain locations. If a sync raster exists, the same quantity or different quantities of sync rasters may exist between adjacent frequency domain locations.

Optionally, the Q indices belong to N index sets, each index set corresponds to one interval, different index sets correspond to different intervals, and N is an integer greater than or equal to 1 and less than or equal to Q; and the interval corresponding to the index set is an interval between two adjacent frequency domain locations of frequency domain locations indicated by indices in the index set.

Q may be equal to N. In this case, each index set may include one index. It indicates that any two intervals between adjacent frequency domain locations are different.

Alternatively, Q may be less than N. In this case, at least one index set may include a plurality of indices. The at least one index set may include the same quantity of indices or different quantities of indices.

Optionally, the index set corresponds to a larger interval in case that a frequency domain location indicated by an index in the index set is farther from the first SS block. In contrast, the index set corresponds to a smaller interval in case that a frequency domain location indicated by an index in the index set is closer to the first SS block.

Table 3 is used as an example for description below. In a particular frequency domain range from a sync raster of the first SS block, an interval that can be indicated between adjacent sync rasters is a first interval. Beyond the frequency domain range, an indicated interval between adjacent sync rasters is a second interval. As shown in the following Table 3, when a sync raster offset falls within a range of −256 to +256, an interval between adjacent sync rasters is 1. Beyond the range of −256 to +256, an interval between adjacent sync rasters is 2.

TABLE 3

| Reserved SSB-sub-carrier-offset | Configuration of a control channel corresponding to RMSI (RMSI-PDCCH-Config) | Raster offset to a next sync raster point with an SSB corresponding to a cell within a cell (Offset to the next sync raster point with cell-defining SSB within a CC) |
| --- | --- | --- |
| R0 | 0 | +1 |
| R0 | 1 | +2 |
| ... | ... | ... |
| R0 | 254 | +255 |
| R0 | 255 | +256 |
| R1 | 0 | −1 |
| R1 | 1 | −2 |
| ... | ... | ... |
| R1 | 254 | −255 |
| R1 | 255 | −256 |
| R2 | 0 | −258 |
| R2 | 1 | +260 |
| ... | ... | ... |
| R2 | 126 | +510 |
| R2 | 127 | +512 |
| R2 | 128 | −258 |
| R2 | 129 | −260 |
| ... | ... | ... |
| R2 | 254 | −510 |
| R2 | 255 | −512 |

Therefore, in this embodiment of this application, frequency domain locations of an SS block are indicated unevenly, so that frequency domain locations that need to be indicated can be flexibly set, thereby implementing flexible communication and reducing bit overheads.

Optionally, the M indices include S indices, frequencies at frequency domain locations indicated by the S indices are all higher or lower than a frequency at a frequency domain location of the first SS block, and S is an integer greater than or equal to 1 and less than or equal to M; and in S frequency domain locations indicated by the S indices, at least one frequency domain location occupies sync rasters whose quantity is different from quantities of sync rasters occupied by frequency domain locations adjacent to the at least one frequency domain location.

Specifically, the Q frequency domain locations exist in a frequency domain having a frequency higher than that at the frequency domain location of the first SS block, the Q frequency domain locations may be indicated by the Q indices, and at least one of the Q frequency domain locations occupies sync rasters whose quantity is different from quantities of sync rasters occupied by frequency domain locations adjacent to the at least one frequency domain location. If Q is less than M, the remaining M-Q frequency domain locations may be located in a frequency domain having a frequency lower than that at the frequency domain location of the first SS block. At least one of the M-Q frequency domain locations occupies sync rasters whose quantity is different from quantities of sync rasters occupied by frequency domain locations adjacent to the at least one frequency domain location. Alternatively, the M-Q frequency domain locations occupy the same quantity of sync rasters.

Alternatively, the Q frequency domain locations exist in a frequency domain having a frequency lower than that at the frequency domain location of the first SS block, the Q frequency domain locations may be indicated by the Q indices, and at least one of the Q frequency domain locations occupies sync rasters whose quantity is different from quantities of sync rasters occupied by frequency domain locations adjacent to the at least one frequency domain location. If Q is less than M, the remaining M-Q frequency domain locations may be located in a frequency domain having a frequency lower than that at the frequency domain location of the first SS block. At least one of the M-Q frequency domain locations occupies sync rasters whose quantity is different from quantities of sync rasters occupied by frequency domain locations adjacent to the at least one frequency domain location. Alternatively, the M-Q frequency domain locations occupy the same quantity of sync rasters.

Optionally, in terms of the quantity of occupied sync rasters, with the frequency domain location occupied by the first SS block being the center point, frequency domain locations in a lower frequency domain and frequency domain locations in a higher frequency domain may be symmetrical, and certainly, may be alternatively asymmetrical.

For example, starting from the frequency domain location occupied by the first SS block, a quantity of sync rasters occupied by an $x^{th}$ frequency domain location in a higher frequency domain may be equal to a quantity of sync rasters occupied by an $x^{th}$ frequency domain location in a lower frequency domain.

Optionally, the S indices belong to T index sets, each index set corresponds to one sync raster quantity, different index sets correspond to different sync raster quantities, and T is an integer greater than or equal to 1 and less than or equal to S and the sync raster quantity corresponding to the index set is a quantity of sync rasters occupied by each of frequency domain locations indicated by indices in the index set.

T may be equal to S. In this case, each index set may include one index. It indicates that different quantities of sync rasters are included at any two frequency domain locations.

Alternatively, T may be less than S. In this case, at least one index set may include a plurality of indices. The at least one index set may include the same quantity of indices or different quantities of indices.

Optionally, the index set corresponds to a larger quantity of sync rasters in case that a frequency domain location indicated by an index in the index set is farther from the first SS block. In contrast, the index set corresponds to a smaller quantity of sync rasters in case that a frequency domain location indicated by an index in the index set is closer to the first SS block.

Therefore, in this embodiment of this application, a quantity of sync rasters included at a frequency domain location may be flexibly set, thereby implementing flexible communication and reducing bit overheads.

Optionally, M frequency domain locations indicated by the M indices and the frequency domain location of the first SS block belong to the same band.

Optionally, in one band, M+1 frequency domain locations correspond to the same M intervals, the M+1 frequency domain locations include the M frequency domain locations indicated by the M indices and the frequency domain location of the first SS block, and each of the M intervals is an interval between two adjacent frequency domain locations of the M+1 frequency domain locations.

For example, when the first SS block is located in a first band, the interval is a first interval; and when the first SS block is located in a second band different from the first band, the interval is a second interval that is not equal to the first interval.

Optionally, in one band, the same quantity of sync rasters is included at the M frequency domain locations.

For example, when the first SS block is located in a first band, a quantity of sync rasters is a first quantity; and when the first SS block is located in a second band different from the first band, a quantity of sync rasters is a second quantity that is not equal to the first quantity.

Optionally, in one band, the M frequency domain locations include the Q frequency domain locations, frequencies at the Q frequency domain locations are all higher than or lower than a frequency at the frequency domain location of the first SS block, and Q is an integer greater than or equal to 1 and less than or equal to M; and at least one of the Q frequency domain locations has different intervals from frequency domain locations adjacent to the at least one frequency domain location.

Optionally, in one band, the M frequency domain locations include S frequency domain locations, frequencies at the S frequency domain locations are all higher than or lower than a frequency at the frequency domain location of the first SS block, and S is an integer greater than or equal to 1 and less than or equal to M; and at least one of the S frequency domain locations occupies sync rasters whose quantity is different from quantities of sync rasters occupied by frequency domain locations adjacent to the at least one frequency domain location.

Specifically, the interval between frequency domain locations and the quantity of sync rasters occupied by a frequency domain location may be related to a band to which a carrier belongs. For example, at least one interval (or at least one quantity of sync rasters) is used for a band n78 (3.3 GHz to 3.8 GHz), and another at least one interval (or at least one quantity of sync rasters) may be used for other bands. For example, in one band, an index indication manner may be shown in Table 3. In another band, different index indications manners may be used. For example, in a range from −128 to +128, an interval between adjacent sync rasters is 1. Beyond the range from −128 to +128, an interval between adjacent sync rasters is 2. There may be more than two different intervals. For example, there are interval 1, 2, and 3.

Therefore, in this embodiment of this application, flexible communication can be implemented based on an interval between frequency domain locations of a band device and a quantity of sync rasters included at a frequency domain location.

Optionally, the at least one indication field includes the first indication field, and the first indication field can be used to carry information in the at least one of M indices or carry resource information of a control channel corresponding to RMSI. Optionally, before the first indication field carries at least one bit of the at least one of M indices, the network device determines that the first indication field needs to carry the at least one bit of the at least one of M indices rather than the resource information of the control channel corresponding to the RMSI.

Specifically, a first indication field in a PBCH included in an SS block may be used to carry at least one bit of the at least one of M indices in this embodiment of this application or used to indicate the resource information of the control channel corresponding to the RMSI. In this case, when the SS block is sent, in needs to be determined to carry the at least one bit of the at least one of M indices in this embodiment of this application or indicate the resource information of the control channel corresponding to the RMSI.

Optionally, the PBCH further includes a second indication field; in case that the second indication field is used to indicate that no associated RMSI exists in the first SS block, the first indication field carries at least one bit of the at least one of M indices; and in case that the second indication field is used to indicate a PRB grid offset between channels or signals of an SS block and a non-SS block, the first indication field carries control information of the control channel corresponding to the RMSI.

Specifically, because the second indication field indicates the information about the PRB grid offset, it indicates that the first SS block has associated RMSI. To receive the RMSI, the first indication field includes the resource information of the control channel corresponding to the RMSI. In case that the second indication field is used to indicate that no associated RMSI exists in the first SS block, the RMSI does not need to be received. In this case, the information in the at least one of M indices mentioned in this embodiment of this application may be carried in the first indication field.

Optionally, all the information in the at least one of M indices mentioned in this embodiment of this application may be carried in the first indication field.

Specifically, when a reserved value in the PRB grid offset information field indicates that no RMSI exists, a bit in a CORESET information field of the RMSI indicates the resource information of the second SS block.

Optionally, the first indication field may carry some bits of the at least one of M indices in this embodiment of this application. When the first indication field carries some information, another indication field may be used to carry some other bits of the at least one of M indices in this embodiment of this application.

Optionally, in case that the second indication field is used to indicate that no associated RMSI exists in the first SS block, the at least one indication field includes the second indication field; the second indication field is further used to indicate some bits of the first index; and the first indication field indicates some other bits of the first index.

Specifically, when a reserved value in the PRB grid offset information field indicates that the RMSI does not exist, the reserved value in the PRB grid offset information field and the bit in the CORESET information field of the RMSI jointly indicate the resource information of the second SS block. As shown in the following Table 4, R0, R1, and R2 are reserved values in the PRB grid offset information field, and can all be used to indicate that the RMSI does not exist. A total of eight bits are used for the CORESET information field of the RMSI and can represent 0 to 255. The two parts of information are used to jointly indicate frequency domain location information of the second SS block. The frequency domain location information indicates a quantity of sync rasters of an offset of a position of a sync raster in which the second SS block is located from a position in which the first SS block is located. A sync raster represents an interval in a frequency domain between SS blocks.

TABLE 4

| Reserved SSB-subcarrier-offset | Configuration of a control channel corresponding to RMSI (RMSI-PDCCH-Config) | Raster offset to a next sync raster point with an SSB corresponding to a cell within a cell (Offset to the next sync raster point with cell-defining SSB within a CC) |
|---|---|---|
| R0 | 0 | +1 |
| R0 | 1 | +2 |
| R0 | 2 | +3 |
| ... | ... | ... |
| R0 | 254 | +255 |
| R0 | 255 | +256 |
| R1 | 0 | +257 |
| R1 | 1 | +258 |
| ... | ... | ... |
| R1 | 78 | +335 |
| R1 | 79 | +336 |
| R1 | 80 | −1 |
| R1 | 81 | −2 |
| ... | ... | ... |
| R1 | 255 | −176 |
| R2 | 0 | −177 |
| R2 | 1 | −178 |
| ... | ... | ... |
| R2 | 158 | −335 |
| R2 | 159 | −336 |
| R2 | 160 | Reserved |
| ... | ... | ... |
| R2 | 255 | Reserved |

Therefore, in this embodiments of this application, a network device adds at least one of M indices to at least one indication field included in a first SS block to indicate a frequency domain location of a second SS block, so that a terminal device may obtain the frequency domain location of the second SS block based on the at least one index.

Figure 11:
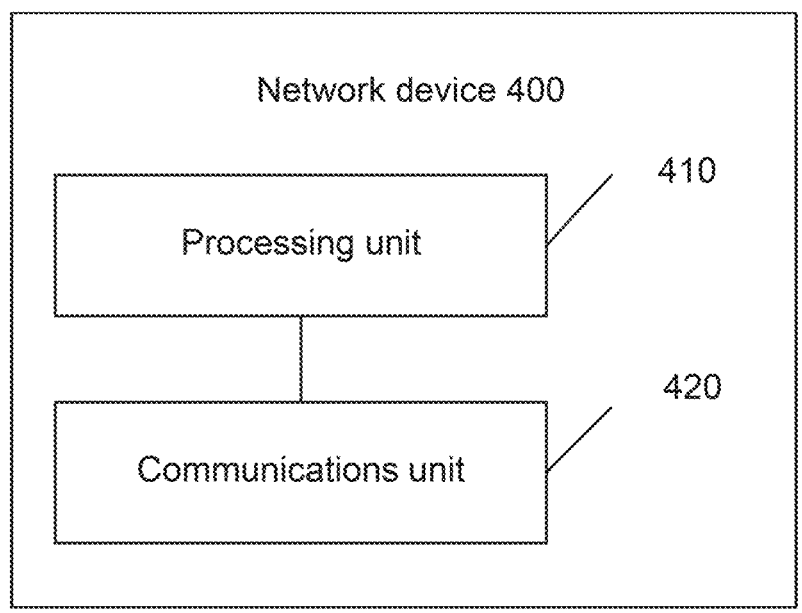
FIG. 11 is a schematic block diagram of a network device according to an embodiment of this application.

FIG. 11 is a schematic block diagram of a network device 400 according to an embodiment of this application. As shown in FIG. 11, the network device 400 includes a processing unit 410 and a communications unit 420.

Optionally, the processing unit 410 is configured to determine that a first indication field in a PBCH included in a first SS block is used to indicate a PRB grid offset between channels or signals of an SS block and a non-SS block or indicate resource information of a second SS block; and the communications unit 420 is configured to send the first SS block, where it is determined that the first indication field is used to indicate the resource information, the first indication field in the PBCH included in the sent first SS block indicates the resource information.

It should be understood that, the network device 400 in this embodiment of this application may correspond to the network device in the method embodiments of this application, and the foregoing and other operations and/or functions of the units in the network device 400 are for the purpose of respectively implementing corresponding procedures of the network device in the method 200 shown in FIG. 2. For brevity, details are not described herein again.

Optionally, the processing unit 410 is configured to generate a first SS block, where a PBCH in the first SS block includes at least one indication field, the at least one indication field is used to carry a first index, the first index includes at least one of M indices, the at least one of M indices is used to indicate a frequency domain location of the second SS block, and M is an integer greater than 1; and the communications unit 420 is configured to send the first SS block.

It should be understood that, the network device 400 in this embodiment of this application may correspond to the network device in the method embodiments of this application, and the foregoing and other operations and/or functions of the units in the network device 400 are for the purpose of respectively implementing corresponding procedures of the network device in the method 800 shown in FIG. 10. For brevity, details are not described herein again.

Figure 12:
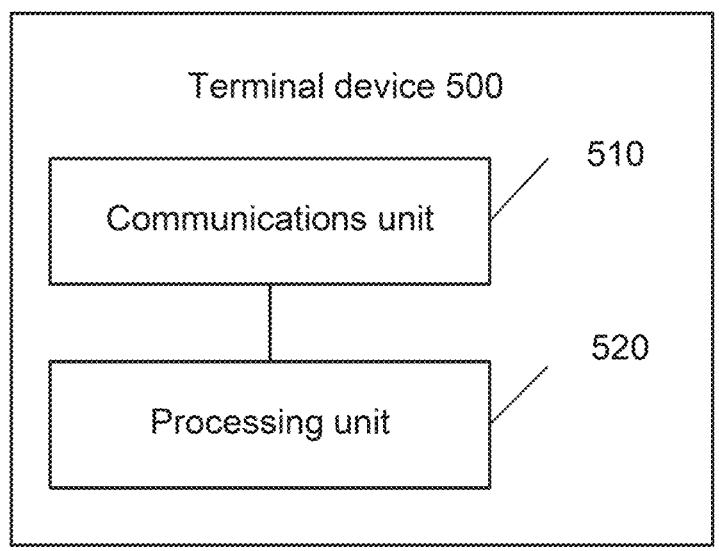
FIG. 12 is a schematic block diagram of a terminal device according to an embodiment of this application.

FIG. 12 is a schematic block diagram of a terminal device 500 according to an embodiment of this application. As shown in FIG. 12, the terminal device 500 includes a communications unit 510 and a processing unit 520.

The communications unit 510 is configured to receive a first SS block.

The processing unit 520 is configured to: determine that a first indication field in a PBCH included in the first SS block indicates a PRB grid offset between channels or signals of an SS block and a non-SS block or indicates resource information of a second SS block; and when the first indication field indicates the resource information, obtain the resource information from the first indication field.

It should be understood that, the terminal device 500 in this embodiment of this application may correspond to the terminal device in the method embodiments of this application, and the foregoing and other operations and/or functions of the units in the terminal device 500 are for the purpose of respectively implementing corresponding procedures of the terminal device in the method 300 shown in FIG. 9. For brevity, details are not described herein again.

Optionally, the communication unit 510 is configured to receive a first SS block, where a PBCH in the first SS block includes at least one indication field, the at least one indication field is used to carry a first index, the first index includes at least one of M indices, the at least one of M indices is used to indicate a frequency domain location of the second SS block, and M is an integer greater than 1; and the processing unit 520 is configured to obtain the frequency domain location of the second SS block.

It should be understood that, the terminal device 500 in this embodiment of this application may correspond to the terminal device in the method embodiments of this application, and the foregoing and other operations and/or functions of the units in the terminal device 500 are for the purpose of respectively implementing corresponding procedures of the terminal device in the method 800 shown in FIG. 10. For brevity, details are not described herein again.

Figure 13:
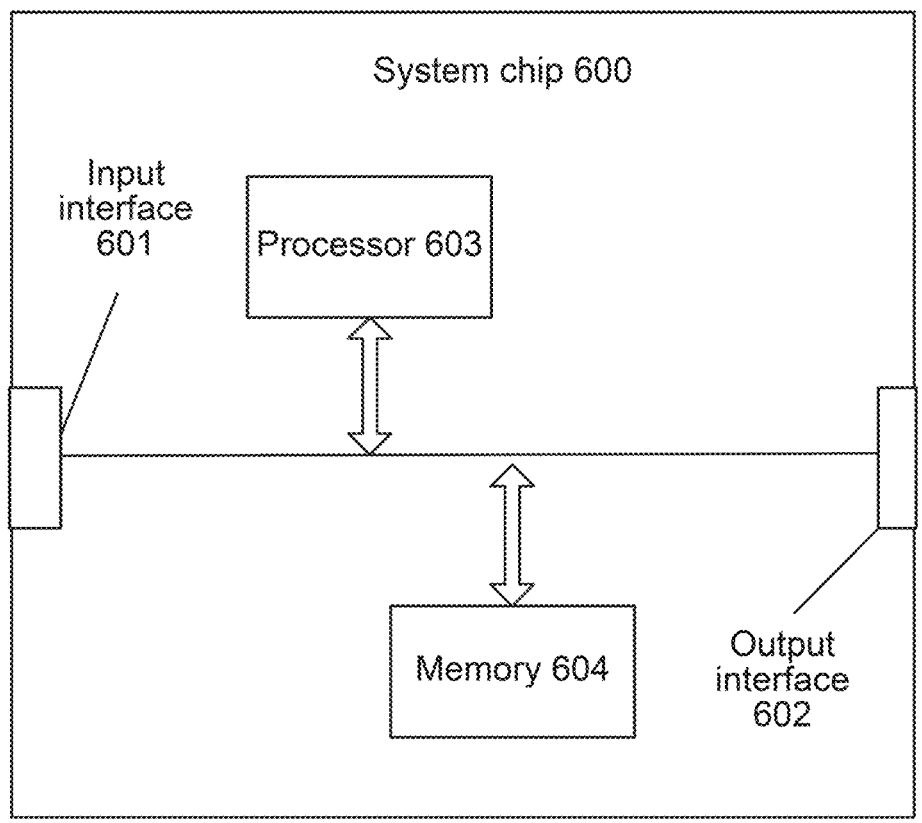
FIG. 13 is a schematic block diagram of a system chip according to an embodiment of this application.

FIG. 13 is a schematic structural diagram of a system chip 600 according to an embodiment of this application. The system chip 600 in FIG. 13 includes an input interface 601, an output interface 602, a processor 603, and a memory 604 that may be connected to each other by using an internal communications connection line, and the processor 603 is configured to execute code in the memory 604.

Optionally, when the code is executed, the processor 603 implements the method performed by the terminal device in the method embodiments. For brevity, details are not described herein again.

Optionally, when the code is executed, the processor 603 implements the method performed by the network device in the method embodiments. For brevity, details are not described herein again.

Figure 14:
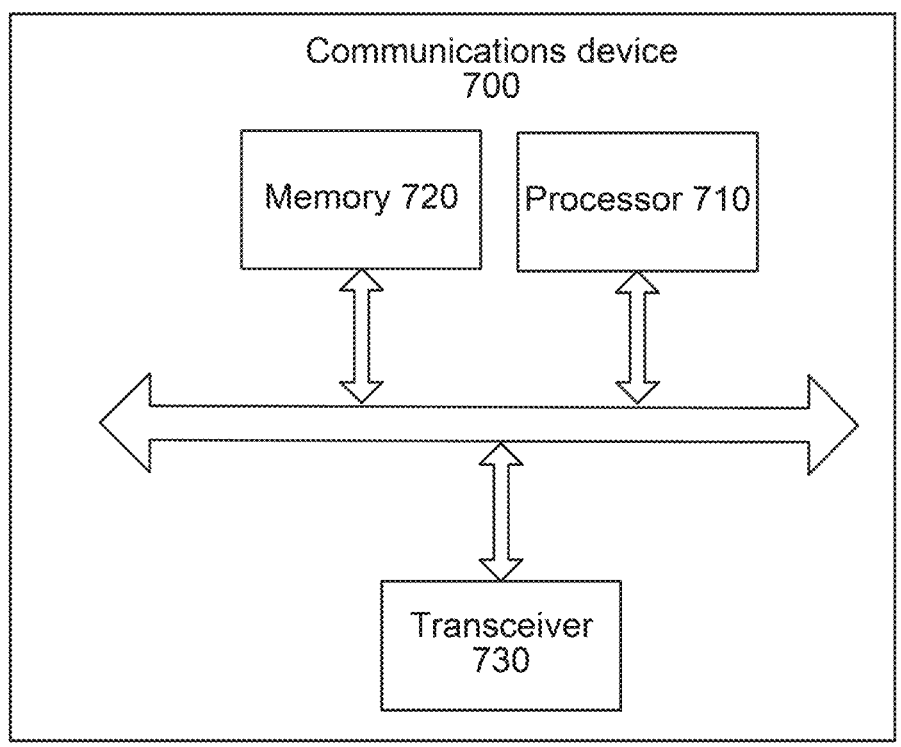
FIG. 14 is a schematic block diagram of a communications device according to an embodiment of this application.

FIG. 14 is a schematic block diagram of a communications device 700 according to an embodiment of this application. As shown in FIG. 14, the communications device 700 includes a processor 710 and a memory 720. The memory 720 may store program code, and the processor 710 may execute the program code stored in the memory 720.

Optionally, as shown in FIG. 14, the communications device 700 may include a transceiver 730, and the processor 710 may control the transceiver 730 to communicate with the outside.

Optionally, the processor 710 may invoke program code stored in the memory 720, to perform corresponding operations of the terminal device in the method embodiments. For brevity, details are not described herein again.

Optionally, the processor 710 may invoke program code stored in the memory 720, to perform corresponding operations of the network device in the method embodiments. For brevity, details are not described herein again.

It should be understood that, the processor of this embodiment of this application may be an integrated circuit chip, and has a signal processing capability. During implementation, the steps of the foregoing method embodiments may be implemented by using a hardware integrated logic circuit in the processor or implemented by using an instruction in a software form. The foregoing processor may be a general purpose processor, a digital signal processor (DSP), an application-specific integrated circuit (ASIC), a field programmable gate array (FPGA), or another programmable logical device, discrete gate or transistor logical device, or discrete hardware component. The processor may implement or perform methods, steps and logical block diagrams disclosed in the embodiments of this application. The general purpose processor may be a microprocessor or the processor may be any conventional processor and the like. Steps of the methods disclosed with reference to the embodiments of this application may be directly executed and completed by means of a hardware decoding processor, or may be executed and completed by using a combination of hardware and software modules in a decoding processor. The software module may be located in a mature storage medium in the field, such as a random access memory (RAM), a flash memory, a read-only memory (ROM), a programmable ROM, an electrically-erasable programmable memory or a register. The storage medium is located in the memory, and the processor reads information in the memory and completes the steps in the foregoing methods in combination with hardware of the processor.

It can be understood that, the memory in the embodiments of this application may be a volatile memory or a non-volatile memory, or may include both a volatile memory and a non-volatile memory. The non-volatile memory may be a ROM, a programmable ROM (PROM), an erasable PROM (EPROM), an electrically EPROM (EEPROM) or a flash memory. The volatile memory may be a RAM, and is used as an external cache. Through exemplary but not limitative description, many forms of RAMs may be used, for example, a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM) and a direct rambus RAM (DR RAM). It should be noted that, the memory for the system and the method described herein aim to include but not limited to these memories and any other suitable types of memories.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional module and sold or used as an independent product, the functions may be stored in a computer-readable storage medium. Based on such an understanding, the technical solutions of this application essentially, or the part contributing to the prior art, or part of the technical solutions may be implemented in the form of a software product. The computer software product is stored in a storage medium, and includes several instructions for instructing a computer device (which may be a personal computer, a server, a network device, and the like) to perform all or some the steps of the method described in the embodiments of this application. The foregoing storage medium includes: any medium that can store program code, such as a USB flash disk, a removable hard disk, a ROM, a RAM, a magnetic disk, or an optical disk.

The foregoing descriptions are merely specific implementation manners of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for wireless communication, comprising:
sending a first synchronization signal (SS) block, wherein the first SS block comprises a physical broadcasting channel (PBCH); the PBCH comprises a first indication field and a second indication field; and the first indication field is used to
indicate a physical resource block (PRB) grid offset between channels or signals of an SS block and a non-SS block or indicate all or some of information of resource information of a second SS block,
wherein the resource information of the second SS block are indicated together by the first indication field and the second indication field; the second indication field is used to indicate some information of the resource information of the second SS block;
and the first indication field is used to indicate some other information of the resource information of the second SS block.

2. The method of claim 1, wherein the first indication field is PRB grid offset information field.

3. The method of claim 1, wherein the resource information of the second SS block comprises information of relative frequency offset between the first SS block and the second SS block.

4. The method of claim 1, wherein the second indication field is control resource set (CORESET) information field.

5. The method of claim 1, wherein no remaining minimum system information (RMSI) is associated with the first SS block.

6. The method of claim 5, wherein a RMSI is associated with the second SS block.

7. A method for wireless communication, comprising:
receiving a first synchronization signal (SS) block, wherein the first SS block comprises a physical broadcasting channel (PBCH); the PBCH comprises a first indication field and a second indication field; and the first indication field is used to indicate a physical resource block (PRB) grid offset between channels or signals of an SS block and a non-SS block or indicate all or some of information of resource information of a second SS block;
determining that the first indication field indicates all or part of information of resource information of the second SS block, wherein the resource information of the second SS block are indicated together by the first indication field and the second indication field; the second indication field is used to indicate some information of the resource information of the second SS block; and the first indication field is used to indicate some other information of the resource information of the second SS block;
obtaining, according to the first SS block, the resource information of the second SS block.

8. The method of claim 7, wherein the first indication field is PRB grid offset information field.

9. The method of claim 7, wherein the second indication field is control resource set (CORESET) information field.

10. The method of claim 7, wherein no remaining minimum system information (RMSI) is associated with the first SS block.

11. The method of claim 10, wherein a RMSI is associated with the second SS block.

12. The method of claim 7, wherein the resource information of the second SS block comprises information of relative frequency offset between the first SS block and the second SS block.

13. A network device, comprising:
a memory configured to store computer-executable instructions; and
one or more processors in communication with the memory and configured to execute the computer-executable instructions to at least:
send a first synchronization signal (SS) block, wherein the first SS block comprises a physical broadcasting channel (PBCH); the PBCH comprises a first indication field and a second indication field; and the first indication field is used to indicate a physical resource block (PRB) grid offset between channels or signals of an SS block and a non-SS block or indicate all or some of information of resource information of a second SS block,
wherein the resource information of the second SS block are indicated together by the first indication field and the second indication field; the second indication field is used to indicate some information of the resource information of the second SS block; and the first indication field is used to indicate some other information of the resource information of the second SS block.

14. The network device of claim 13, wherein the first indication field is PRB grid offset information field, and the second indication field is control resource set (CORESET) information field,
wherein no remaining minimum system information (RMSI) is associated with the first SS block; and a RMSI is associated with the second SS block,
wherein the resource information of the second SS block comprises information of relative frequency offset between the first SS block and the second SS block.

15. A terminal device, comprising:
a memory configured to store computer-executable instructions; and
one or more processors in communication with the memory and configured to execute the computer-executable instructions to at least:
receive a first synchronization signal (SS) block, wherein the first SS block comprises a physical broadcasting channel (PBCH); the PBCH comprises a first indication field and a second indication field; and the first indication field is used to indicate a physical resource block (PRB) grid offset between channels or signals of an SS block and a non-SS block or indicate all or some of information of resource information of a second SS block;
determine that the first indication field indicates all or part of information of resource information of the second SS block, wherein the resource information of the second SS block are indicated together by the first indication field and the second indication field; the second indication field is used to indicate some information of the resource information of the second SS block; and the first indication field is used to indicate some other information of the resource information of the second SS block;
obtain, according to the first SS block, the resource information of the second SS block.

16. The terminal device of claim 15, wherein the first indication field is PRB grid offset information field.

17. The terminal device of claim 15, wherein the second indication field is control resource set (CORESET) information field.

18. The terminal device of claim 15, wherein no remaining minimum system information (RMSI) is associated with the first SS block.

19. The terminal device of claim 18, wherein a RMSI is associated with the second SS block.

20. The terminal device of claim 15, wherein the resource information of the second SS block comprises information of relative frequency offset between the first SS block and the second SS block.

\* \* \* \* \*